United States Patent [19]
Clarke et al.

[11] Patent Number: 5,865,964
[45] Date of Patent: Feb. 2, 1999

[54] APPARATUS FOR STRIPPING IONS FROM CONCRETE AND SOIL

[75] Inventors: Robert Lewis Clarke; Stephen Robert Clarke, both of Orinda, Calif.

[73] Assignee: Electrochemical Design Associates, Inc., Berkeley, Calif.

[21] Appl. No.: 671,915

[22] Filed: Jun. 28, 1996

Related U.S. Application Data

[62] Division of Ser. No. 394,563, Feb. 27, 1995, abandoned.

[51] Int. Cl.$^6$ ............................. C25B 15/00; C25B 9/00
[52] U.S. Cl. ..................... 204/232; 204/237; 204/238; 204/240; 204/648
[58] Field of Search ....................... 204/232, 237, 204/238, 240, 515, 648; 205/688, 702, 724, 734, 771, 742

[56] References Cited

U.S. PATENT DOCUMENTS

| | | | |
|---|---|---|---|
| 3,637,473 | 1/1972 | Greenspan et al. | 204/46 |
| 4,219,390 | 8/1980 | Stuart et al. | 204/54 R |
| 4,422,917 | 12/1983 | Hayfield | 204/196 |

(List continued on next page.)

FOREIGN PATENT DOCUMENTS

| | | | |
|---|---|---|---|
| 0 312 174 | 4/1989 | European Pat. Off. | B09B 5/00 |
| 865225 | 9/1981 | Russian Federation . | |
| 2 178 759 | 2/1986 | United Kingdom | C25F 7/00 |
| 2 240 342 | 7/1991 | United Kingdom | C02F 1/46 |
| 2 240 550 | 7/1991 | United Kingdom | C02F 1/46 |
| 2 240 551 | 7/1991 | United Kingdom | C02F 1/46 |
| 2 240 550 | 8/1991 | United Kingdom . | |
| 2 244 282 | 11/1991 | United Kingdom | C02F 1/46 |

OTHER PUBLICATIONS

Wu et al., "Deionization by a Reversible Electrolytic lo Exchange Process" Off. Proc. Comb., 6th Conf. Asia Pac. Confed. Chem. Eng., 21st Australas. Chem. Eng. Conf., vol. 1, 335/1–340/1. No Date Available.

Yunker, S.B., Radovich, J.M., *Enhancement of Growth and Ferrouy Iron Oxidation Rates of T. Ferrooxidans by Electrochemical Reduction of Ferric Iron.* Biotech and Bioengineering vol. XXIII, pp. 1867–1875 (1996). No Month Available.

(List continued on next page.)

*Primary Examiner*—Bruce F. Bell
*Assistant Examiner*—Edna Wong
*Attorney, Agent, or Firm*—Limbach & Limbach L.L.P.; Seong-Kun Oh

[57] ABSTRACT

A method and an apparatus for stripping ionic species from a porous material, such as concrete or soil, are presented. The ionic species include metals and complexes, and may include radioactive species. The contaminated medium can be in bulk or in particulate form and can be treated according to the invention in situ or in a batch container. In the method, a dc potential difference is established across the contaminated material over which an alternating current may be superimposed. Ionic species migrate within the contaminated material under the influence of the potential difference and dissolve in the electrolyte. The electrolyte can be protected from radiation degradation by use of a radioactive-resistant ion exchange material. Ionic species can be desorbed electrochemically from the electrolyte, allowing the electrolyte to be recycled for additional stripping of contaminated media. The recovered ionic species can be used as feedstock for other processes. The apparatus preferably includes an electrolytic material, means for electrochemically regenerating the electrolytic material, noncorroding electrodes capable of sustaining a current that is reverse of that which induces ionic species to migrate from contaminated medium and a power supply for establishing a potential difference across the contaminated material. Salt precipitation on the electrodes and within the medium are avoided. Neutral zones within the medium are also eliminated.

14 Claims, 4 Drawing Sheets

U.S. PATENT DOCUMENTS

| | | | |
|---|---|---|---|
| 4,548,695 | 10/1985 | Bridger et al. | 204/284 |
| 4,596,641 | 6/1986 | Bridger et al. | 204/151 |
| 4,790,918 | 12/1988 | Bridger et al. | 204/149 |
| 4,912,286 | 3/1990 | Clarke | 174/110 A |
| 4,936,970 | 6/1990 | Weinberg et al. | 204/242 |
| 4,964,966 | 10/1990 | Moreland et al. | 204/280 |
| 4,971,666 | 11/1990 | Weinberg et al. | 204/59 R |
| 5,074,986 | 12/1991 | Probstein et al. | 204/130 |
| 5,137,608 | 8/1992 | Acar et al. | 204/130 |
| 5,264,018 | 11/1993 | Koenigeberg et al. | 71/63 |
| 5,378,328 | 1/1995 | Baltazar et al. | 204/105 R |
| 5,396,756 | 3/1995 | Brodsky et al. | 166/248 |
| 5,405,509 | 4/1995 | Lomasney et al. | 204/130 |
| 5,433,829 | 7/1995 | Pool | 205/130 |
| 5,435,895 | 7/1995 | Lindgren et al. | 204/182.2 |
| 5,443,700 | 8/1995 | Hirose et al. | 204/149 |
| 5,458,747 | 10/1995 | Marks et al. | 204/130 |
| 5,476,992 | 12/1995 | Ho et al. | 588/204 |
| 5,489,370 | 2/1996 | Lomasney et al. | 204/647 |
| 5,510,033 | 4/1996 | Ensley et al. | 210/611 |
| 5,512,479 | 4/1996 | Steffan | 435/262.5 |
| 5,536,636 | 7/1996 | Gnann et al. | 210/631 |
| 5,538,636 | 7/1996 | Gnann et al. | 210/631 |
| 5,545,803 | 8/1996 | Heath et al. | 588/253 |
| 5,589,056 | 12/1996 | Pool | 205/766 |

OTHER PUBLICATIONS

Thompson. B.G. *Communications to the Editor Electrochemical Ion Control in Batch Cultures of Saccharomyces cerevisiac NCYC 1018*. Biotech. and Bioengineering, vol. XXVII, p. 1994 188 (1986)I No Month Available.

Atlas, R. M., *Slick Solutions,* Chemistry in Britain, pp. 42–45 (May 1996).

Pineo, C. C., Beyke, G., Lageman, R.; *Heating Methods to Enhance Soil Remediation by Vacuum Extraction: Recent Field Applications in North America and Europe,* Risk Management Conference, Sicily, Italy, Nov. 1995, World Scientific Publishing Co., (1996) No Month Available.

Wu et al., "Deionization by a Reversible Electrolytic lo Exchange Process", Off. Proc. Comb. Conf., 6th Conf. Asia Pac. Confed. Chem. Eng., 21st Australas. Chem. Eng. Conf., vol. 1, 335/1–340/1, 1993.

FIG. 6

APPARATUS FOR STRIPPING IONS FROM CONCRETE AND SOIL

This is a divisional of application Ser. No. 08/394,563, filed Feb. 27, 1995 abandoned.

BACKGROUND OF THE INVENTION

The present invention relates to the removal of ionic contaminants from porous materials. More particularly, the present invention relates to a method and an apparatus for electrochemically stripping ionic species from concrete or soil.

Ionic species present in the atmosphere, soil or bodies of water can leach into neighboring soils or even concrete. These ionic species act as contaminants that reduce utility of the contaminated soil or concrete and shorten the usable lifespan of steel reinforcement in concrete by contributing to problems such as corrosion.

In addition to these natural mechanisms, contamination may occur by man-made processes. For example, large quantities of building materials such as concrete are contaminated in the processing and storage of radioactive materials. Refinement of uranium 235 from naturally-occurring ore typically is carried out in large concrete structures. Efforts to reduce the amount of concrete contaminated in this way have included use of precious and heavy metal shielding, but this is very expensive. Also, suitable material substitutions are limited since few engineering materials can withstand the corrosive effect of some of the compounds generated during processing. Thus, huge quantities of these materials are produced which, by virtue of the nature of the contamination, are unsuitable for other purposes.

Electrochemical methods for removing ionic contaminants including metals, such as sodium and iron cations, from soil are known. One technique, known as "soil washing" involves forcing water through the contaminated soil to "flush" out water-solubilized ions. Ionic species physically adsorbed because of ionic bonding to the contaminated medium generally are not removed in this way.

Methods of inhibiting corrosion of steel reinforcement bars in concrete by impressed current cathodic protection are also known. Conventionally, anodes made from precious metal- or metal oxide-coated titanium or niobium, or conductive paints are used. Other forms include protection applied to the concrete surface.

In another electrochemical method, corrosion of steel reinforcement bars in concrete is inhibited by removing corrosion accelerants such as chlorine anions. In this method, an electrolyte-soaked material is applied to the concrete surface, over which an anode is applied. Once a driving current is established across the concrete, chlorine ions migrate toward the anode and into the electrolyte-soaked material.

In these electrochemical methods, ions migrate under the influence of the applied driving current. Thus, positively charged ions migrate as an acidic "front" through the contaminated medium toward the cathode while an alkaline "front" of negatively charged ions migrates in an opposing direction toward the anode. These fronts typically can meet within the contaminated medium as well as on the electrode surface, whereupon salts or alkaline hydroxide form. Precipitates disturb maintenance of the driving current supporting ion migration, so that ionic contaminants can no longer be removed effectively from the medium. The electrochemical process stops. Buildup of these precipitates can even cause catastrophic failure of the contaminated medium.

Conventionally, a direct current voltage source is used to set up the driving current, thereby creating a constant flux of ionic contaminants through the medium. In addition, for a given electrochemical technique, precious metal oxide coated titanium and other conventional electrodes are designed to function as either an anode or a cathode, but not both. Indeed, such electrodes would be destroyed in an attempt to carry a fluctuating current, i.e., an alternating current, because a given electrode designed to serve as an anode when current flowed in a certain direction would not function as a cathode in response to the fluctuation of current direction and would instead dissolve or passivate. Hence, conventional electrodes work best with such direct current sources for which they will assume a role as either an anode or a cathode.

One approach to eliminating build up of such precipitates on the electrodes would be to simply "reverse" the current, e.g., use an alternating current source, from that used to support the ionic migration. As discussed above, the inability of conventional electrodes to remain operable throughout the cyclic variation in current direction in alternating currents forestalls this as an option. In addition, the fluctuating nature of alternating current would not lend itself to producing a constant ion flux. Alternatively, conventional electrodes may be plagued by corrosive by-products of the electrochemical process, making it very difficult to sustain treatment of contaminated media over an extended period of time. Typically, efforts to minimize corrosion involve shielding electrodes by on-going extraction of corrosive agents from the medium as treatment progresses.

In some circumstances, the ability to reverse the polarity of the electrodes or apply an AC current can be beneficial in maintaining the pH of the electrolyte and aiding the solubilization of specific ions.

In some cases where the rebar could be corroded by removal of anions, where the reinforcing bar could act as the anode. AC techniques applied directly to the rebar could be used to eliminate the corrosion effect created if they were acting as dc anodes in the circuit.

Sometimes, it would be desirable to use multiple anodes and cathodes to set up a driving current. A problem in doing so during conventional electrochemical remediation processes is that "neutral zones" form in contaminated medium approximately equidistant from adjacent anode pairs and from adjacent cathode pairs. While on a macroscopic level, the level of contamination in the medium being treated is reduced, a significant portion of ionic contamination may remain in these neutral zones since ionic contaminants do not migrate due to inadequate electrical field at the neutral zones.

Limited alternatives are available to eliminate these neutral zones. For example, current may be increased to strengthen the electrical field within the contaminated medium. Besides being energy-intensive, excessive heat may be generated that may adversely affect the medium or inhibit on-going treatment. Also, the anodes and cathodes may be reconfigured so that the respective anodic and cathodic functions of particular electrodes could be switched. However, as discussed above, conventional electrode materials cannot withstand the reversal of current that would most easily accomplish this switch.

Another possible solution to the problem of neutral zones is halting the treatment process before completion, removing the anodes and cathodes from the medium and reapplying them to the medium so that locations previously occupied by anodes were then occupied by cathodes and vice versa. The process could then be continued. This option is particularly unattractive due to the expense and time- and labor-intensive effort that would be involved.

Another significant limitation of these techniques is their inability to address the insidious, extremely destructive and poisonous nature of ionic contaminants that are radioactive. Conventional materials may not be able to withstand irradiation from radioactive species. For example, carbon-carbon and carbon-hydrogen bonds in organic electrolytic or ion exchange materials are destroyed by radiation emitted from radioactive species. In addition, practice of such electrochemical techniques on the scale needed to treat the voluminous quantities of contaminated concrete or soil, often widely distributed around the world, can be prohibitively expensive.

Nevertheless, it would be advantageous to effectively strip ionic contaminants from a variety of solid, but porous, media according to electrochemical principles. It would be particularly advantageous to do so on site, that is, without removing the contaminated medium from its original location for treatment, and without destruction of bulk structures that are contaminated. It would also be advantageous to treat contaminated media in particulate form, such as concrete rubble or soil clods. Elimination of neutral zones would also be advantageous.

Particularly in the case where the ionic species include radioactive contaminants, it would be advantageous to carry out the treatment with minimal human and environmental exposure to the radioactivity and without exacerbating waste disposal problems.

Accordingly, it is an object of the present invention to provide a method for and an apparatus to efficiently strip ionic contaminants from media including concrete or soil, in situ or in batch modes.

SUMMARY OF THE INVENTION

The present invention achieves these and other objects by providing a method for and an apparatus capable of electrochemically stripping ionic contaminants from concrete or soil or other porous materials on site and in a safe and effective manner.

In one aspect of the present invention, ionic contaminants are stripped from a bulk medium in situ. A dc driving current is established across the medium so that the ionic contaminants are induced to migrate into an electrolyte under the influence of the driving current. An ac overvoltage can be superimposed over the dc driving current to enhance electromigration. Ionic contaminants can be recovered from the electrolyte by electrochemical ion exchange, permitting the electrolyte to be recycled.

In another aspect of the invention, an apparatus includes several electrodes that are capable of sustaining at different times currents of opposing flow and between which a dc driving current is established. One direction of current flow being associated with migration of the ionic species toward the electrodes and the other direction being associated with removing salt precipitates from the electrodes. Ionic contaminants migrating in response to the driving current can be solubilized in an electrolyte.

BRIEF DESCRIPTION OF THE DRAWINGS

The invention will be better understood by reference to the appended figures wherein.

DETAILED DESCRIPTION OF THE PREFERRED EMBODIMENTS

The phrase "ionic species" is used herein to denote charged or polarizable particles, such as metal cations, anionic complexes or radicals. The ionic species may be organic or inorganic.

The term "radioactive" is used herein to denote naturally occurring or man-made radioisotopes of elements such as uranium or plutonium and the products of their radioactive decay, such as strontium and cesium, their ions, complexes, radicals and compounds thereof.

Typically, the ionic species are physically adsorbed, i.e., ionically bonded, or are solubilized in pockets of water or moisture accommodated within the lattice structure of the contaminated medium.

In general, contaminated media suitable for treatment according to the present invention are porous and may be in bulk, e.g., a wood panel or building, a concrete slab or building, or particulate, e.g., pieces of wood, clods of soil or concrete rubble. Contaminated media in particulate form suitable for treatment according to the present invention also includes refuse, mud, dredgings, industrial sludges and the like.

While undergoing treatment, the medium, especially plots of contaminated soil or concrete structures, may remain in situ so that its physical disposition need not be changed in the course of treatment according to the present invention. Particulate media may be treated without movement to another location or may be put into a container for treatment.

Techniques for in situ treatment of contaminated media will be described first with reference to FIG. 1.

In situ treatment according to the present invention generally involves setting up and maintaining a driving current of sufficient magnitude across an ionically contaminated medium 10, causing electromigration of anionic and cationic species, as indicated by arrows 12 and 14, to a desired location, e.g., an electrolyte. This electromigration may be accomplished by creating an electrical circuit which includes the contaminated medium.

The actual configuration of the circuit depends in large part on the physical disposition on the contaminated medium. The right side of the figure shows how an electrode, in this figure, the anode 16, may be inserted into a medium in particulate form, though in situ. The particulates are generally denoted at 15. The left side of the figure shows how an electrode, here a cathode 18, may be inserted into a bulk medium. These electrodes may be rods, tubes, cables, panels or other forms known in the art. In this figure, electrode 16 serves as an anode and electrode 18 serves as a cathode, relative to the direction of migration of the ionic species. The electrodes are connected to a power supply 20.

Water in the contaminated medium assists in ionic electromigration both because it solubilizes many ionic species and can migrate under the influence of the electrical field, as indicated by arrow 22.

It is even more preferable to bring an electrolyte medium into contact with the contaminated medium to improve electrical conductivity. It may be desirable to incorporate an electrolyte management system 24 into the apparatus. Electrolyte management system 24 typically includes one or more electrochemical ion exchange units 26, 28 and may include one or more pumps 30, 32 to assist with electrolyte flow therein and to the electrodes. Such an electrolyte management system permits regeneration of the electrolyte by separating the ionic contamination therefrom, which contamination may be recovered in a stream 34. The regenerated electrolyte may be recycled back to each of the electrodes for additional stripping. The electrolyte management system also provides a convenient point in the apparatus to adjust pH as desired, if lines 35 connecting units 26 and 28 are provided, as discussed in greater detail below.

When current flows, ionic species will migrate according to their charges, as described in greater detail below. In a manner of speaking, then, the contaminated medium acts as an "ion exchange medium," as both the water-solubilized and physically adsorbed ionic species migrate into the electrolyte. More specifically, ionic species will migrate under the influence of the driving current through the contaminated medium into the electrolyte. The driving current creates positively and negatively charged streams or "bands" moving through the contaminated medium, desorbing ionically bonded contaminants as the bands progress. Water-solubilized ionic contaminants are swept up in the charged streams and are ultimately dissolved in the electrolyte. Levels of ionic contamination are thus reduced in the contaminated medium and may be collected in a form much more easily disposed of than the contaminated medium. Another possible use for the recovered contaminants is as a feedstock to other processes. Also, the present invention makes use of principles of cathodic protection "in reverse," taking out of the electric circuit steel reinforcement bars that would conventionally be made to assume a relatively more negative potential to avoid corrosion.

The pH of the electrolyte medium may be adjusted depending on the characteristics of the ionic species being removed as the stripping process progresses. For example, where anions such as cyanide are contaminants, the electrolyte medium should be maintained sufficiently alkaline to avoid liberation of hydrogen cyanide gas during treatment according to the present invention. Likewise, where species such as phenol are contaminants, a relatively acidic pH in the electrolyte medium is preferred. Adjustment of the pH is achieved by the addition or removal of acid or base as necessary. Adjustment of pH may be accomplished sequentially, for example, first, to allow for removal of certain ionic species under relatively acidic conditions and then, removal of other ionic species under basic conditions, as desired.

Water can be directed to the electrolyte reservoir tanks or pumped directly to the electrode chambers to replenish moisture within the medium and help control acidity.

Typically, a contaminated medium has some level of moisture, since some water penetrates from the surrounding environment. Water assists practice of the present invention as the solvent for many ionic species. This water and any contaminants solubilized therein migrate through the contaminated medium from the area surrounding the anode as hydrated hydrogen ion and appearing at the cathode as hydrogen gas. Because water facilitates the migration of the ionic species through the contaminated medium and helps control the increasing acidity therein, especially near the anode, it is desirable to replenish the water in the contaminated medium over time. Such replenishment can be conveniently accomplished at openings in the contaminated medium through which an electrode was inserted. Replenishment with water substantially free of the ionic species sought to be removed according to the present invention is especially desirable. The water added for replenishment need not be completely "deionized", since the presence of certain ions may assist in balancing pH, as discussed below.

As the present invention is carried out, concentration of ionic species increases over time both in the electrolytic material and at its interface with the cathode. The "loaded" electrolytic material may be disposed of or, preferably, is regenerated to permit recycling back for further stripping. Flow of water within the contaminated medium provides an effective mechanism by which the ionic contaminants may be downloaded into a form that is much more conveniently handled and disposed of than the originally contaminated medium. Once downloaded, these ionic contaminants may provide feedstocks for processes.

Figure 2:
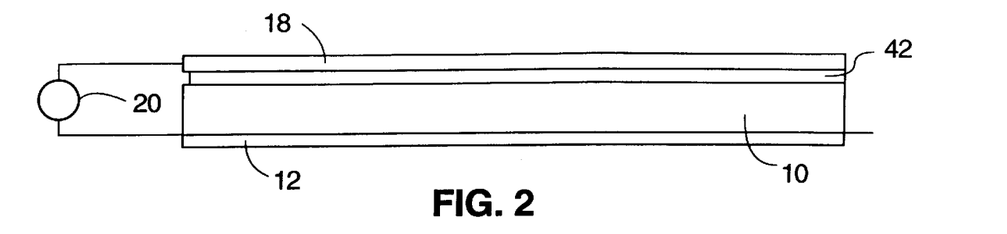
FIGS. 2, 3 and 4 are schematic illustrations of in situ treatment of contaminated concrete reinforced with steel using an apparatus according to the present invention.

FIG. 2 illustrates an apparatus in which an electric circuit including a contaminated medium 10 is established. The medium 10 is in situ, that is, has not been moved or taken from its original location in order for treatment to be carried out. For such a medium, electrodes may be attached to or inserted in a suitable surface of the medium. Thus, an anode 16 may be inserted into openings, not shown, in the contaminated medium or may be contacted with a surface of the contaminated medium 10. The openings can be existing ones or may be created for the purpose of inserting the anode. Anionic species will be attracted toward the anode. Similarly, a cathode 18 may be inserted into openings, not shown, in the contaminated medium or may be contacted with a surface of the medium. Cationic species will be attracted toward the cathode.

Figure 3:
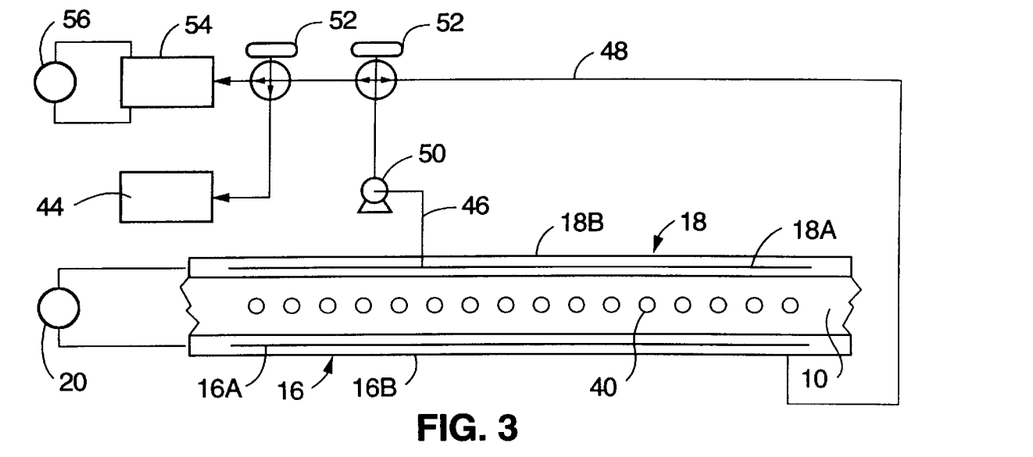

Non-corroding electrodes are especially preferred since they may be left in place without harming the medium or used for cathodic protection of steel reinforcement bars 40, as shown in FIG. 3, when the stripping process has been completed. Also, desirably, the anodes and cathodes sustain a sufficiently high current density without excessive heat generation. In a preferred embodiment, anode 16 and cathode 18 are cables having a conductive core coated by a porous acid-resistant polymeric or ceramic material. An example is an aluminum or a copper cable having a $Ti_nO_{2n-1}$ (e.g., $Ti_4O_7$) outer coating, such as those sold under the trademark EBONEX, commercially available from CBC Electrodes of Orinda, Calif. The coating serves as the active electrode surface, through which mobilized contaminants might pass from the medium to solubilize in the electrolyte medium.

Another benefit of utilizing electrodes of this type of composition is that a single electrode may function as an anode or as a cathode as needed during the process. For example, advantage may be taken of this ability by applying an alternating current so that for periods of time, current flow is in a direction reverse to that applied during the stripping. Electrodes are cleaned of salt buildup without dissolving the electrode material in its place, as would otherwise happen. A low frequency ac current, e.g., where several minutes, hours or days pass before the cycle is adjusted, can accomplish this purpose.

Although several figures herein show a single anode and a single cathode, it is possible and may be particularly desirable to carry out the present invention utilizing several electrodes, i.e., an electrode array. For example, multiple anodes and cathodes may be arranged to establish a uniform field of sufficient strength across the medium. Such an electrode grouping is described more fully in connection with FIG. 7, below.

Figure 1:
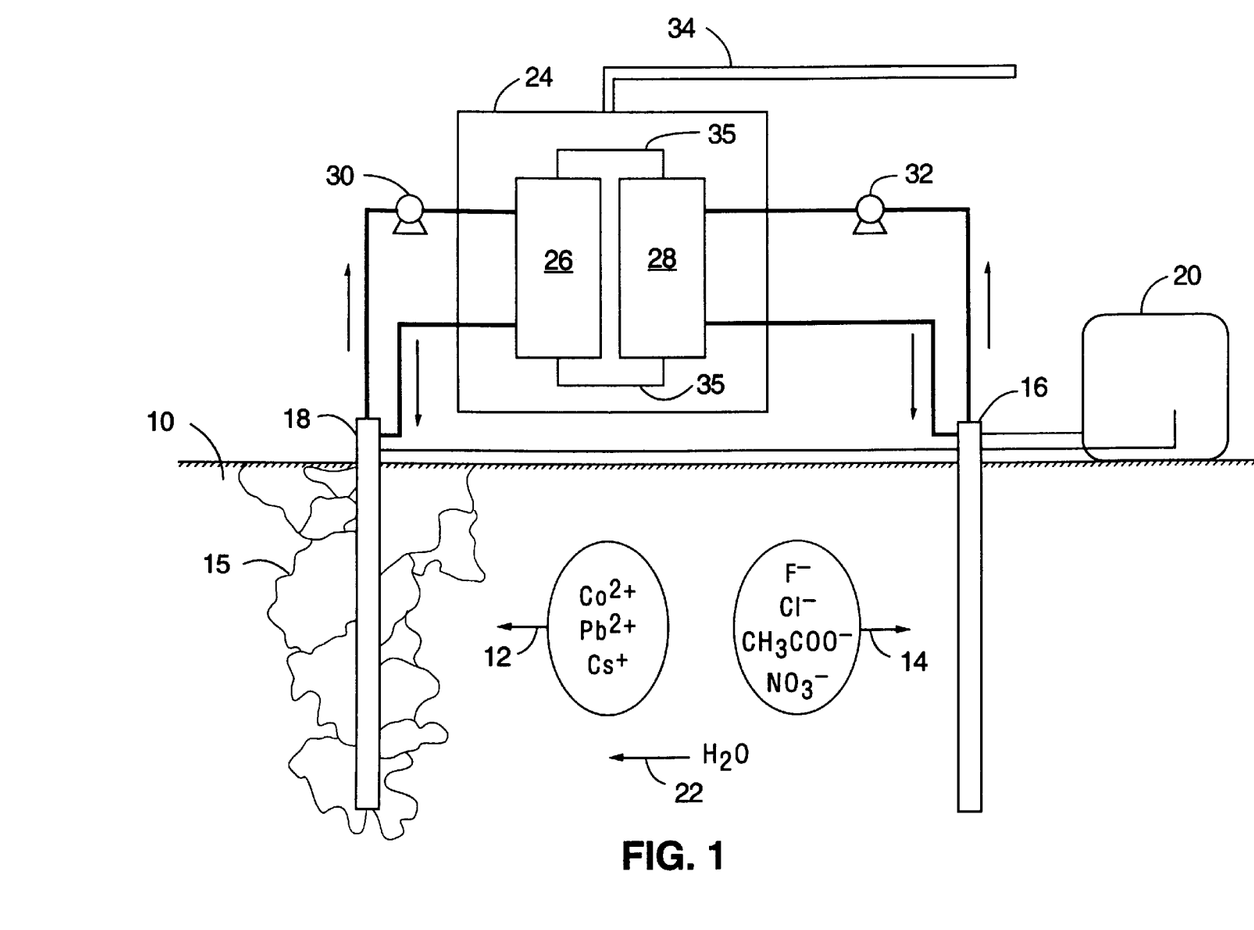
FIG. 1 is a schematic illustration of in situ treatment of contaminated media according to the present invention.
Figure 4:
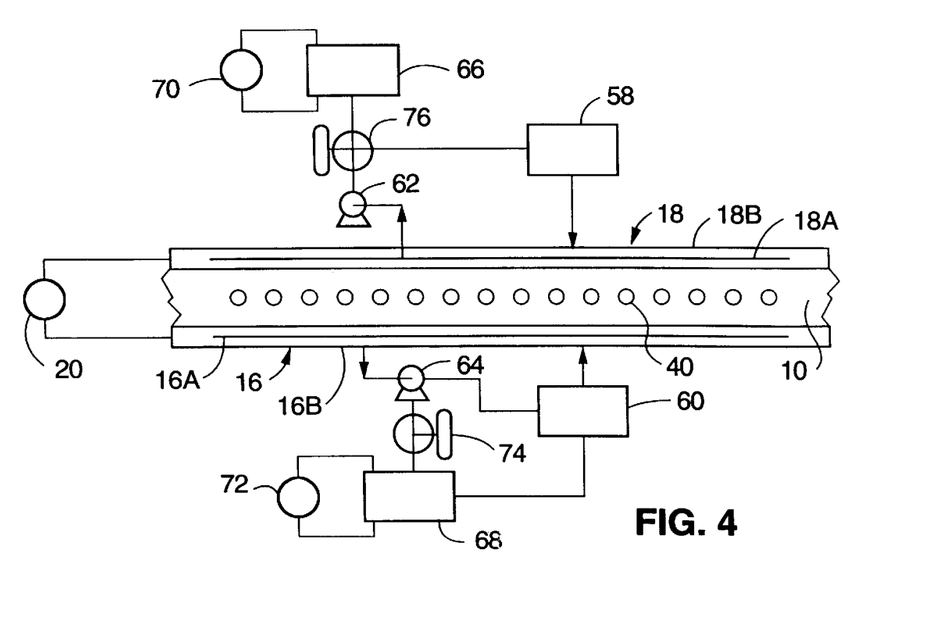

To facilitate electromigration of the species though the contaminated medium, electrolytic material 42 may be provided directly to the electrodes, as shown in FIG. 1, 3 or 4, or may be applied to the surface of contaminated medium 10, as shown in FIG. 2. A suitable form of electrolytic material is a porous material, e.g., a plastic or ceramic in the form of a sheet or diaphragm, soaked with an electrolyte medium, such as are well known in the art. Some of the electrolyte medium may permeate into the pores of the contaminated medium. The electrolyte medium may also include special anions or sequestering agents that assist in the eventual recovery of the ionic species.

When the electrolytic material is in the form of a porous pad soaked with a liquid electrolyte medium overlying the surface of a large plot or slab of contaminated medium, a planar cathode can be attached easily to the surface of the pad. After a period of time, when the contaminant concentration in the electrolyte has increased sufficiently, the pad is simply removed from the contaminated medium surface.

Power supply 20 connects anode 16 and cathode 18 by conventional means. Power supply 20 provides a current, establishing a driving current across the contaminated medium. Adequate current to induce the ionic species to migrate generally will be about 2–5 amps per square foot of anode surface area or whatever current is sufficient as for stripping without creating excessive heat. Conventional voltage- or current-regulated power mains or locally generated power supplies and any number of current or voltage control systems may be utilized for this purpose. Power supplies may be controlled remotely to provide the desired driving current in the contaminated medium.

If multiple anodes and cathodes are used, more than one power supply may be used to connect all of the anodes and cathodes in order to establish a uniform electrical field of sufficient strength across the contaminated medium being treated at a given time.

While the method according to the present invention may be carried out using either an alternating current or a direct current mode, it is preferable to superimpose an alternating current over a dc driving current. The superposition of the alternating current component helps promote ion migration through the contaminated medium. An ac overvoltage having a higher frequency than the ac current used to clean the electrodes, as discussed above, is suitable. Thus, an ac current of 1–2 Hz may be superimposed over the dc field. In addition, the alternating current component assists in removing any deleterious salt precipitates that may build up on the electrodes as the stripping treatment progresses.

FIG. 3 shows an alternative arrangement for the electrodes, power supplies, electrolyte reservoirs and electrochemical ion exchange systems suitable for carrying out the present invention. In one embodiment, the electrodes are positioned adjacent to the contaminated medium 10, such as concrete with steel reinforcing bars 40. In a preferred embodiment, anode 16 and cathode 18 are cables 16a, 18a inside sealed cylindrical chambers 16b, 18b, respectively, formed from a porous acid-resistant plastic, such as the cable anodes described above which are coated with EBONEX™ brand titanium suboxide. Chambers 16b, 18b are filled with an electrolyte medium supplied from electrolyte reservoir tank 44 via lines 46, 48, respectively, pump 50 and valve 52. Preferably, after a period of time as the contaminants build up in the electrolyte medium, the electrolyte medium is circulated by appropriate adjustment of valve 52 through an electrochemical ion exchange unit 54. Unit 54 is connected to power supply 56 for the purpose of establishing a driving current across the ion exchange material therein for downloading of and shielding of the electrolyte from the contaminants, as desired. Use of unit 54 also permits monitoring of the increasing concentration of ionic species, including radioactive species, in the electrolyte medium and adjusting acidity therein. After downloading of the contaminants, the electrolyte is directed back to the apparatus.

The arrangement of the components of the electric circuit and establishment of the driving current exclude any steel reinforcement bars 40 in the contaminated medium from the electrical circuit.

FIG. 4 illustrates another arrangement of an apparatus according to the present invention. In this embodiment, chambers 16b, 18b are filled from separate electrolyte reservoirs 58, 60 via pumps 62, 64, respectively. Electrochemical ion exchange units 66, 68 are connected to power supplies 70, 72. Flow of electrolyte between the reservoirs 58, 60, chambers 16b, 18b and ion exchange units 66, 68 is controlled via valves 74, 76.

Arrangement of the electrochemical ion exchange reservoirs, as exemplified in FIGS. 3 and 4, facilitates such regeneration. Broadly, suitable electrochemical regeneration techniques involve downloading of the ionic contaminants into an ion exchange material. The electrolyte loaded with ionic species is contacted with the electrochemical ion exchange medium in an electrochemical ion exchange unit. The ionic species are desorbed from the electrolyte medium into the electrochemical ion exchange medium because a driving current is established across the ion exchange medium that is the reverse of that maintained to get the ionic species to migrate into the electrolyte medium. Each electrochemical ion exchange unit is connected to a separate power supply that supplies a dc current that is the "reverse" of that used when stripping the ionic species from the contaminated medium. In particular, electrochemical techniques such as described in GB 2 244 282A, GB 2 240 551B, GB 2 240 550A, GB 240 342A, GB 2 178 759B, incorporated herein in their entireties by reference, are suitable for accomplishing regeneration of the electrolyte in accordance with the present invention. The regenerated electrolyte is directed to the electrolyte storage reservoir from which the electrolyte supplies are drawn. If different electrolytes are used for the anolyte and the catholyte, separate electrochemical ion exchange units may be used to regenerate each electrolyte, as shown in FIG. 4. These separate units also facilitate precise control of acidity in the electrolyte and medium being treated and provide an opportunity to capture acidic or alkaline ionic species generated at one part of the apparatus that may be used advantageously elsewhere in the apparatus. For example, increasing amounts of acidic species in the anolyte electrochemical ion exchange unit may be withdrawn therefrom and added to the catholyte electrochemical ion exchange unit to depress the pH in the catholyte so as to avoid formation of metal hydroxide precipitates within a medium being treated.

When the ionic species contaminating the medium include radioactive species, additional measures may be taken to confine the radioactive species and to protect the electrolyte from the degradative effects thereof. Both goals may be accomplished by utilizing a radioactive-resistant ion exchange material to download the radioactive ionic species from the electrolyte after the species have been stripped from the contaminated medium. Radioactive-resistant ion exchange materials should be selected on the basis of the particular radioactive ionic species being stripped. Thus, for uranium and radioactive strontium, suitable inorganic ion exchange materials include titanium zirconium phosphate, such as described in GB 2 240 342A, or titanium zirconium chloride ion exchange materials commercially available from AEA Technology of Harwell, Oxon, England. Use of such radioactive-resistant ion exchange materials in a reservoir separate from the electrolyte reservoir allows for controlled concentration of the radioactive ionic species in a way that minimizes human exposure and safely and effectively contains the radioactive ionic species, such as illustrated in FIGS. 3 and 4.

Ultimate recovery of the ionic species is facilitated by elution thereof from the electrochemical ion exchange medium to yield more highly concentrated forms of waste or by vitrification techniques. Thereafter, electrolyte medium from reservoirs 44, 58, or 60 may be recirculated to the electrodes to solubilize additional quantities of radioactive ionic species from the contaminated medium.

Figure 5A:
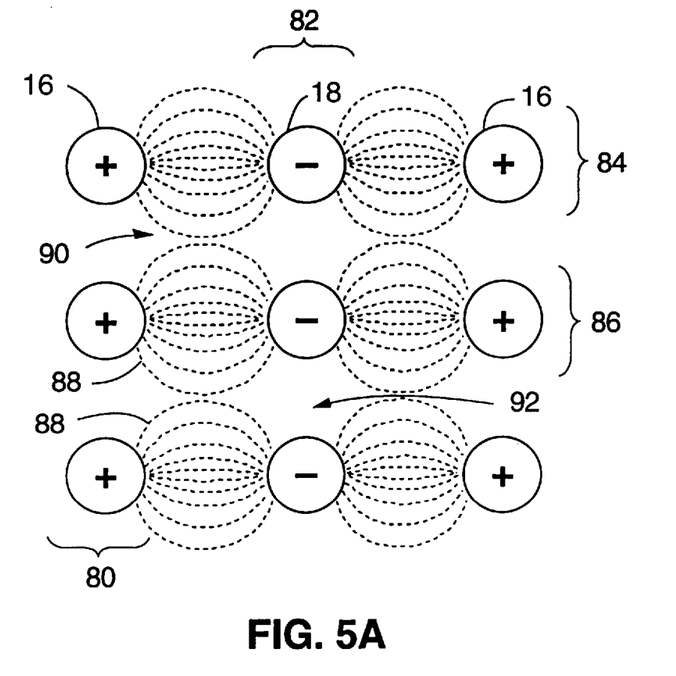
FIGS. 5A and 5B are schematic illustrations of an electrode array of anodes and cathodes suitable for eliminating neutral zones in contaminated media.
Figure 5B:
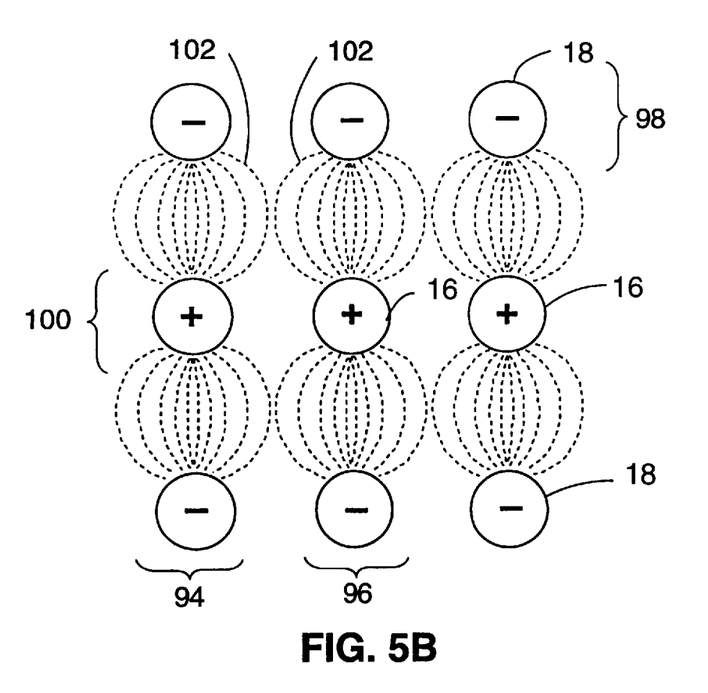

FIGS. 5A and 5B illustrate a preferred electrode arrangement for treating relatively large areas, e.g., plots of land or concrete structures to eliminate neutral zones. For ease of illustration only in these figures, these electrodes are represented as circles, but may in fact be plates, cables or other forms, as described above. Also, not shown in these figures are existing connections to any electrolyte reservoirs, electrochemical ion exchange units or power supplies.

Figure 5A illustrates a vertical or horizontal line 80 of several anodes 18 (bearing a "+" sign) positioned in a contaminated medium so as to be parallel to a horizontal or vertical line 82 of several cathodes 16 (bearing a "−" sign). Oriented perpendicularly to lines 80 and 82 are lines 84 and 86. Lines 84 and 86 are lines in which anodes alternate with cathodes. This arrangement is such that every portion of the medium being treated has at least one anode and an adjacent cathode.

When power is supplied, a driving current is established between anode-cathode pairs, as indicated by field lines 88, along which field lines ionic contaminants migrate according to their ionic charges en route to removal from the contaminated medium. As can be seen in FIG. 5A, neutral zones 90 form between pairs of adjacent anodes in line 80 and neutral zones 92 form between pairs of adjacent cathodes in line 82. In these neutral zones, the electrical field drops off substantially so that little, if any, electromigration occurs. The present invention provides a mechanism for eliminating these neutral zones, as illustrated in FIG. 5B, by taking advantage of electrodes formed from materials that can maintain electrode function in response to a current reversal.

Thus, in a preferred embodiment, power to the electrodes is adjusted so that the polarity of the driving current, i.e, the electrical field, is rotated relative to its direction in FIG. 5A. FIG. 5B shows a 90° rotation of the electrical field. Such an alteration of power may be carried out at an appropriate point in the treatment, e.g., halfway to two-thirds of planned completion if neutral zones were not being eliminated.

As can be seen by comparing FIGS. 5A and 5B, the effect of simply adjusting power in this way is that line 80 of consecutive cathodes 18 becomes a line 94 of anodes 16 alternating with anodes 18. Similarly, line 82 of consecutive cathodes becomes a line 96 of cathodes 18 alternating with anodes 16. Lines 84 and 86, both having anodes alternating with cathodes, become lines 98 and 100 of consecutive anodes and consecutive cathodes, respectively. Field lines 102 have assumed an orientation that is 90° to that of field lines 88 in FIG. 5A. Thus, neutral zones 90 and 92 come under the influence of field lines 102 so that ionic contaminants in these zones will be removed.

Although FIGS. 5A and 5B show two dimensional electrode groupings, the present invention contemplates electrode arrangements that, on a macroscopic level, can form any of a variety of more complex two- and three-dimensional geometries, such as body centered cubed or hexagonal close packed groupings.

By way of example, if such an arrangement is used with an electrode spacing of 1–2 yards and an electrode driving current of 80 volts, it would be capable of treating an area containing the electrodes and removing industrial scale metallic contamination over a period of 3–9 months.

As indicated above, the contaminated medium may also be in particulate form. In the case of stripping rubble or clods of soil, for example, the present invention may be carried out in a batch mode.

Figure 6:
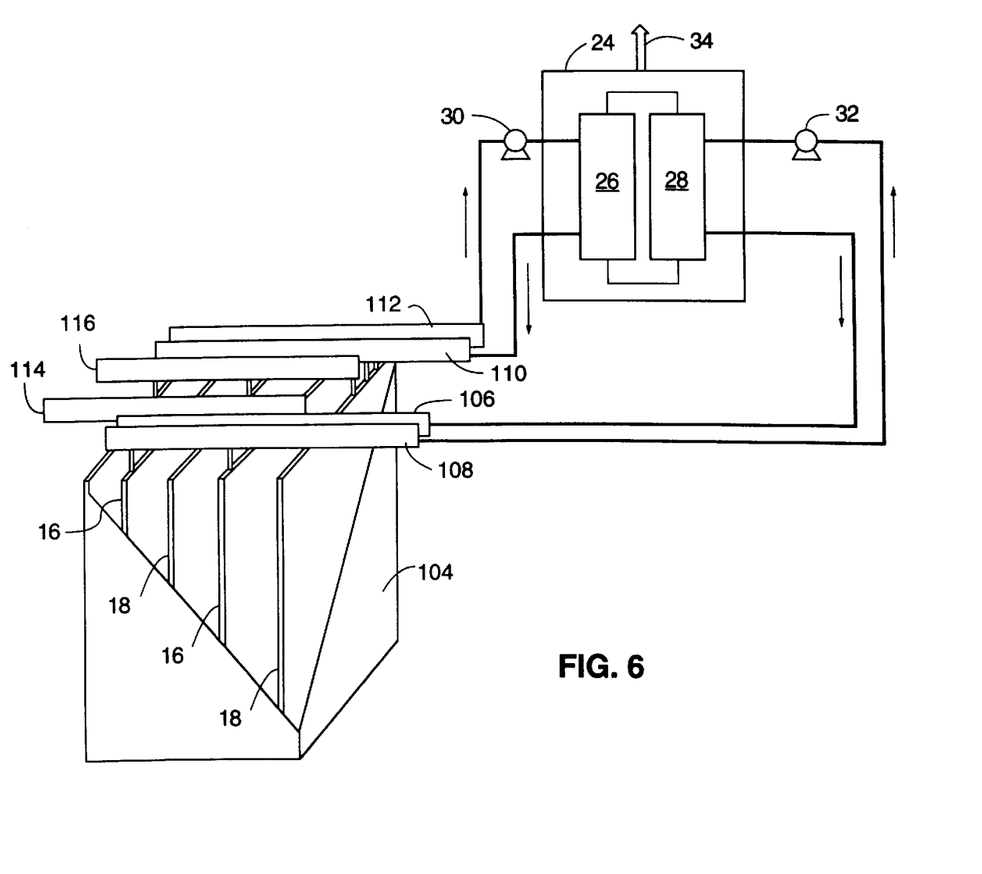
FIG. 6 is a partial view of a container suitable for treatment of contaminated media in particulate form according to the present invention.

FIG. 6 illustrates one technique for carrying out such a treatment. In this figure, the electrodes form part of container 104 into which the particulate contaminated media is added. Generally, container 104 is constructed to enable the free loading and unloading of the contaminated particulate media. Anode 16 and cathode 18 either may be inserted into openings or holes that are present or formed in or amongst the particulates. As in other embodiments of the present invention, the electrodes can take a variety of forms, including planar sheets, rods and tubes, to establish electrical contact with the media.

Also as shown in FIG. 6, additional anodes 16 and cathodes 18 are alternating planar sheets fitted in container 104. Each anode 16 is connected to an electrolyte inlet tube 106 and outlet tube 108. Each cathode 18 is connected to an electrolyte inlet tube 110 and outlet tube 112. In a preferred embodiment, outlet tubes 108 and 112 are connected to pumps 30, 32 that direct the electrolyte to an electrolyte management system 24 that includes electrochemical ion exchange units 28, 26 for electrolyte regeneration, as described above. Ions recovered from electrolyte regeneration may be withdrawn as a stream 34 that may be used elsewhere.

Power to the anodes and cathodes for setting up the driving current in the medium is provided by connection to respective current distributors 114, 116. Suitable current distributors are made from highly conductive materials such as a copper bar that may be positioned relative to the container to facilitate connection of all anodes to one bar and all of the cathodes to the other bar.

Container 104 can be filled by dumping the contaminated particulates (not shown) into the spaces between adjacent electrodes. After treatment, the decontaminated particulates may be dumped or otherwise removed from container 104.

Elimination of neutral zones as described above may also be carried out in such a batch operation. For example, the electrodes may be made from materials that are capable of functioning as either an anode or a cathode, depending on the nature of the current applied. For example, planar electrodes may be designed to include electrically conductive materials based on EBONEX™ framed by a porous plastic membrane.

Utilizing such a batch container having an internal volume of about 1 cubic yard and capable of accommodating an electrode spacing of 2–10 inches, and establishing a driving current of 40 volts, it would be possible to treat industrial scale metallic contamination at a daily rate of 0.5–5 tons.

In summary, the method and apparatus of the present invention provide versatile and extremely advantageous means for treating ionically contaminated media, whether in bulk or particulate form. According to the present invention, recovery of ionic contaminants may be accomplished at the site of contaminated medium and without destruction or excessive invasion of the structure being treated. The substantial expense and numerous hazards associated with transportation of contaminated media are thereby avoided. Components utilized in an apparatus according to the present invention are resistant to the degradative effects of acids and radioactive ionic species encountered, allowing extended use. Electrode components in particular may be capable of enhancing the degree of contamination within particular regions of a contaminated medium simply and in a cost-effective manner.

In addition, the present invention limits handling of and contact with the contaminated material itself to reduce dangers of radiation exposure. Hazardous waste management resources are conserved by the ability to recycle, to concentrate wastes and even to adapt components, such as the electrodes, for other purposes such as cathodic protection of stainless steel reinforcement.

The present invention also achieves an apparatus that is portable, easily used and maintained and capable of remote operation. A simple water replenishment mechanism serves to control acidity and moisture content. While the present invention is disclosed by reference to the preferred embodiments and examples set forth above, it is to be understood that these examples are intended in an illustrative rather than a limiting sense. It is contemplated that modifications will readily occur to those skilled in the art, which modifications will be within the spirit of the invention and with scope of the appended claims.

We claim:

1. An electroremediation apparatus for treating a contaminated solid of sludge, comprising:
   a plurality of electrodes, each individual electrode selectively functioning as either an anode of as a cathode and each electrode comprising a porous, chemically inert housing and a conductive member;
   circulating means for circulating an electrolyte between said contaminated solid or sludge and an electrolyte management system; and
   power supply means connected to the electrodes, the power supply means for establishing a DC potential difference across the contaminated solid or sludge that causes migration of ionic species contaminating the solid or sludge into said electrolyte, and providing current for removing salt precipitates from the electrodes, the salt precipitates forming as a result of the migration of ionic species;
      wherein said electrolyte management system is connected to the electrodes and through which said electrolyte circulates, the electrolyte management system comprising an ion exchange medium and a power supply means for providing a potential difference across the ion exchange medium to effect removal of the ionic contaminants from and regenerate the electrolyte for recycling to said contaminated solid of sludge.

2. An apparatus according to claim 1, wherein the solid or sludge comprises concrete, soil, wood, or mixtures thereof.

3. An apparatus according to claim 1, further comprising means to superimpose an AC overvoltage on the DC potential difference across the solid or sludge.

4. An apparatus according to claim 1, wherein the ionic contaminants comprise radioactive species.

5. An apparatus according to claim 4, wherein the electrolyte is shielded from the radioactive species.

6. An apparatus according to claim 1, wherein said ionic species comprise inorganic contaminants.

7. An apparatus according to claim 1, wherein said ionic species comprise organic contaminants.

8. An electroremediation apparatus for treating a contaminated solid or sludge, comprising:
   electrode means comprising a plurality of electrodes, each of said electrodes selectively acting as either an anode or as a cathode, and each of said electrodes comprising a porous, chemically inert housing and a conductive member;
   circulating means for circulating an electrolyte between said contaminated solid or sludge and an electrolyte management system; and
   power supply means connected to the electrodes to the electrodes for establishing a DC potential difference across the contaminated solid of sludge to cause migration of ionic species contaminating the solid of sludge into said electrolyte, for providing current for removing salt precipitates from the electrodes, said salt precipitates forming as a result of the migration of the ionic species;
   wherein said electrolyte management system is connected to the electrodes through which electrolyte circulates, the electrolyte management system comprising an ion exchange medium and a power supply for providing a potential difference across the ion exchange medium to effect removal of the ionic contaminants from and regenerate the electrolyte for recycling to said contaminated solid or sludge.

9. An electroremediation apparatus for treating a contaminated solid of sludge, comprising:
   a plurality of electrodes, each individual electrode selectively functioning as either an anode or as a cathode and each electrode comprising a porous, chemically inert housing and a conductive member;
   circulating means for circulating an electrolyte between said contaminated solid of sludge and an electrolyte management system;
   power supply means connected to the electrodes, the power supply means for establishing a DC potential difference across the contaminated solid or sludge that causes migration of ionic species contaminating the solid or sludge into said electrolyte, and providing current for removing salt precipitates from the electrodes, the salt precipitates forming as a result of the migration of ionic species; and
   means to superimpose an AC overvoltage on the DC potential difference across the solid of sludge;
      wherein said electrolyte management system is connected to the electrodes and through which said electrolyte circulates, the electrolyte management system comprising an ion exchange medium and a power supply means for providing a potential difference across the ion exchange medium to effect removal of the ionic contaminants from and regenerate the electrolyte for recycling to said contaminated solid of sludge.

10. The apparatus of claim 9 wherein the solid or sludge comprises concrete, soil, wood, or mixtures thereof.

11. The apparatus of claim 9 wherein the ionic contaminants comprise radioactive species.

12. The apparatus of claim 11 wherein the electrolyte is shielded from the radioactive species.

13. The apparatus of claim 9 wherein said ionic species comprise inorganic contaminants.

14. The apparatus of claim 9 wherein said ionic species comprise organic contaminants.

* * * * *